(12) United States Patent
Issacci et al.

(10) Patent No.: US 6,756,144 B2
(45) Date of Patent: Jun. 29, 2004

(54) INTEGRATED RECUPERATION LOOP IN FUEL CELL STACK

(75) Inventors: Farrokh Issacci, Playa Del Rey, CA (US); Rajiv Doshi, Torrance, CA (US)

(73) Assignee: Hybrid Power Generation Systems, LLC, Torrance, CA (US)

( * ) Notice: Subject to any disclaimer, the term of this patent is extended or adjusted under 35 U.S.C. 154(b) by 372 days.

(21) Appl. No.: 10/038,471

(22) Filed: Jan. 3, 2002

(65) Prior Publication Data

US 2003/0124401 A1 Jul. 3, 2003

(51) Int. Cl.$^7$ .................................................. H01M 8/04
(52) U.S. Cl. ........................ 429/26; 429/26; 429/13; 429/24; 429/34; 429/38; 429/39
(58) Field of Search ....................... 429/26, 13, 24, 429/34, 38, 39

(56) References Cited

U.S. PATENT DOCUMENTS

| | | | |
|---|---|---|---|
| 3,595,699 A | | 7/1971 | Baude |
| 5,338,622 A | * | 8/1994 | Hsu et al. ...................... 429/26 |
| 5,340,664 A | | 8/1994 | Hartvigsen |
| 5,462,817 A | | 10/1995 | Hsu |
| 6,136,462 A | | 10/2000 | Kriechbaum et al. |
| 6,146,779 A | | 11/2000 | Walsh |
| 6,194,092 B1 | | 2/2001 | Ohara et al. |

FOREIGN PATENT DOCUMENTS

JP 60035469 2/1985

OTHER PUBLICATIONS

Minh, N.Q., *Ceramic Fuel Cells*, Journal of the American Ceramic Society, 76, p. 563, 1993.
Schuler et al., "The Sulzer Hexis SOFC Series Product: A Technology Challenge", Fifth European Solid Oxide Fuel Cell Forum, Proceedings, vol. 1, Jul. 1–5, 2002.

* cited by examiner

*Primary Examiner*—Patrick Ryan
*Assistant Examiner*—Angela J. Martin
(74) *Attorney, Agent, or Firm*—Sutherland Asbill & Brennan LLP (57) ABSTRACT

A method and apparatus to increase fuel cell reliability and maintainability is disclosed. The apparatus includes a recuperating loop consisting of a spiral tube that surrounds a stack or a combination of several stacks. If the fuel cell stacks are externally manifolded, the recuperating loop may also surround the external manifold. The spent hot gases from the stack directly flows over the recuperating loop to transfer heat to a coolant flowing through the loop providing heat exchange by convection and radiation. The spent hot gases may be manifolded and may not flow over the recuperating loop. In this case, the heat exchange is by radiation between the hot fuel cell stack(s) and the recuperating loop.

30 Claims, 5 Drawing Sheets

INTEGRATED RECUPERATION LOOP IN FUEL CELL STACK

BACKGROUND OF THE INVENTION

This invention relates to a fuel cell system which uses the waste heat from hot exhaust coming out of fuel cell stacks to increase the overall fuel cell efficiency. More particularly, the present invention focuses on a method and apparatus to simplify the heat exchange to recuperate the high temperature gas at the outlet of a fuel cell without the complexity of an external recuperator or heat exchanger. The current invention may also eliminate a recuperator from a fuel cell system while maintaining the heat recuperation efficiency to increase the system reliability and maintainability. In effect, the current invention replaces complicated and costly heat exchanger or multiple heat exchangers and associated complex piping and ducting.

Fuel cells electrochemically react fuels with oxidants to generate electricity. The key components in a fuel cell include a cathode material, an electrolyte material, and an anode material. The electrolyte is a non-porous material sandwiched between the cathode and anode materials. The fuel and oxidant fluids are typically gases and are continuously passed through separate passageways. A fuel gas can be hydrogen, a short chain hydrocarbon, or a gas containing desired chemical species in some form. An oxidant may be an oxygen containing gas, or quite commonly air. Reactant gases, fuels and oxidants, are typically pre-heated before being fed to electrolyte. Electrochemical conversion occurs at or near the three-phase boundaries of each electrode (cathode and anode) and the electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

One of the common constructions of fuel cells is a solid oxide fuel cell (SOFC) that uses solid electrolytes for power generation. Solid electrolytes are either ion conducting ceramic or polymer membranes. In the former instance, the electrolyte is typically made of a ceramic, such as dense yttria-stabilized zirconia (YSZ) ceramic, that is a nonconductor of electrons, which ensures that the electrons must pass through the external circuit to do useful work. With such an electrolyte, the anode is oftentimes made of nickel/YSZ cermet and the cathode is oftentimes made of doped lanthanum manganite.

SOFCs of various construction geometries have been designed. These include the tubular, segmented cells in series, and planar geometries. These various constructions are described in "Ceramic Fuel Cells" by N. Q. Minh, Journal of the American Ceramic Society, 76, p. 563, 1993.

Sometimes, a planar construction resembles a cross-flow heat exchanger in a cubic configuration. The planar cross flow fuel cell is built from alternating flat single cell membranes (which are trilayer anode/electrolyte/cathode structures) and bipolar plates (which conduct current from cell to cell and provide channels for gas flow into a cubic structure or stack). The bipolar plates are oftentimes made of suitable metallic materials. The cross-flow stack is manifolded externally on four faces for fuel and oxidant gas management.

A radial or co-flow design is another popular design in fuel cell construction. An annular or circular shaped anode and cathode sandwich an electrolyte therebetween. Annular or circular shaped separator plates sandwich the combination of anode, cathode, and electrolyte. A fuel manifold and an oxidant manifold respectively direct fuel and oxidant to a central portion of the stack so that the fuel and oxidant can flow radially outward from the manifolds.

Regardless of the particular fuel cell configuration, the electrochemical reaction between the fuel and oxidant produces electric energy, spent fuel and oxidant exhaust. Quite often, the exhaust gas from a fuel cell is the original reactant gas which has been depleted of the particular migrating species in ionic form as a result of the electrochemical reaction. This conversion of fuel and oxidant to electricity in a fuel cell also produces heat, particularly at high current/power densities, which is removed to maintain the fuel cell at an efficient operating temperature.

Conventional thermal management in a fuel cell forces a cooling medium, either a liquid or gaseous coolant stream, through the fuel cell assembly. Coolants, such as water or air, are used for fuel cell heat exchange depending on the operating temperature of the fuel cell. The coolant enters a fuel cell at a temperature near the operating temperature of the fuel cell. When the coolant passes through the fuel cell, the waste energy from the electrochemical reaction in the fuel cell is carried away by the heat capacity of the coolant. The volume flow of the coolant is closely related to the temperature rise of the cooling medium that is determined by the constraints associated with thermal stress of the components in the fuel cell such as ceramic cells in an SOFC. The heat exchange system typically incorporates mechanical components to facilitate the heat transfer to the cooling medium. Flow channels are routinely employed to keep coolant, fuel and oxidant in their separate passage. In many cases, the cooling medium is also a reactant, e.g., air in an SOFC. The effectiveness of heat exchange is, thus, dependent on the available heat transfer surfaces and efficiency of radiation and convection.

To achieve higher voltages for specific applications, the individual electrochemical cells are connected together in series to form a stack. To achieve higher currents, individual cells are connected in parallel. Electrical connection between cells is achieved by the use of an electrical interconnect between the cathode and anode of adjacent cells. The electrical interconnect oftentimes also provides for passageways which allow oxidant fluid to flow past the cathode and fuel fluid to flow past the anode, while keeping these fluids separated. Also typically included in the stack are ducts or manifolding to conduct the fuel and oxidant into and out of the stack.

In a traditional fuel cell system design, hot exhaust gas from the fuel cell is fed to the heat exchanger, and preheated reactant gas is received from the heat exchanger through insulated piping. For high temperature fuel cells such as SOFCs and molten carbonate fuel cells, costly alloy materials are often used for such piping. The heat exchanger and piping also require considerable installation and maintenance expense, particularly in a multi-stack fuel cell. An effective heat exchange system in a multi-stack fuel cell requires some piping surfaces at each individual stack to maintain an optimal operating temperature for each and overall fuel stack efficiency. One of the problems encountered by a fuel cell design in this aspect can be illustrated by the following example:

When a circulating coolant is used to circulate through the passageways in the fuel assembly, a pump may be required to circulate the coolant. Furthermore, connecting tubes, an expansion tank, radiator, thermal and/or other controls may be necessary to properly complete the heat exchange system. In addition to the added expense and the complexity of integrating the circulating coolant system with the multi-stack fuel assembly, other issues are the need of electricity to operate the pump, the pump is subject to mechanical failure, coolant may become contaminated or ionized resulting in electric short circuits or shunts in the fuel assembly, and the coolant may leak into the fuel cell reaction areas and/or freeze-up. This is a major challenge to a fuel cell thermal designer from the standpoint of weight, cost, structure integrity, maintenance and reliability.

Many have attempted to provide a simpler solution to the heat exchange requirement in a fuel cell assembly. Of particular interest are the following references:

U.S. Pat. No. 3,595,699 focuses on an active cooling method to maintain fuel cell temperature by electrically monitoring the current when it is increased. This allows the control system to react when fuel cell temperatures rise, and by how much before the temperature rises. However, the patent does not cover preheating or thermal integration, and is certainly not related to the overall system efficiency.

Figure 5:
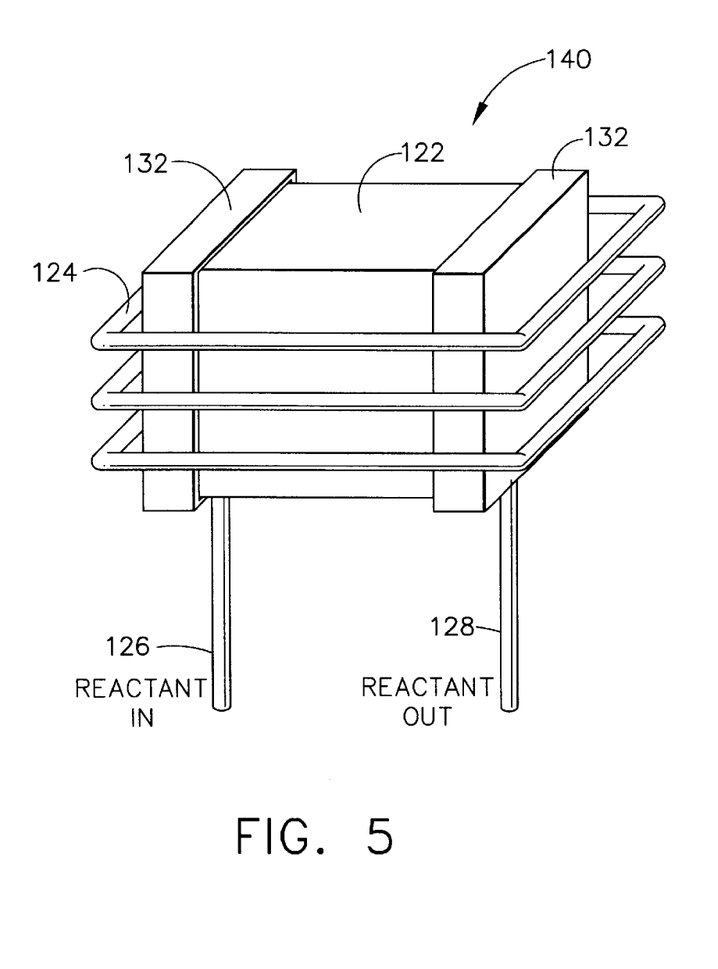
FIG. 5 is a diagram of an isometric view of a fuel cell stack incorporating a recuperator loop including external manifold with the fuel cell reactant inlet and outlet ends shown according to an embodiment of the present invention.

U.S. Pat. No. 5,338,622 claims a gas permeable membrane to transfer heat from the fuel cell exhaust to a cooling medium, which is not a reactant of the fuel cell, predominantly by radiation to a separate medium, or by a direct contact with the stack. The use of a gas permeable membrane and a non-reactant heat transfer medium adds complexity to the heat exchange system. A related patent, U.S. Pat. No. 5,462,817, further claims radiative heat transfer from a hot stack (not its exhaust) to a closed loop heat exchanger containing a separate cooling medium that is not a reactant for the fuel cell nor is a product. The cold and hot streams flow in two separate passages (FIG. 5). This decouples flows between the heat exchange fluid or medium and the reactants and products. The oxidant of the fuel is not preheated by the heat exchanger. Energy is needed to circulate the coolants and a separate heating mechanism must be provided to preheat the oxidant.

Figure 6:
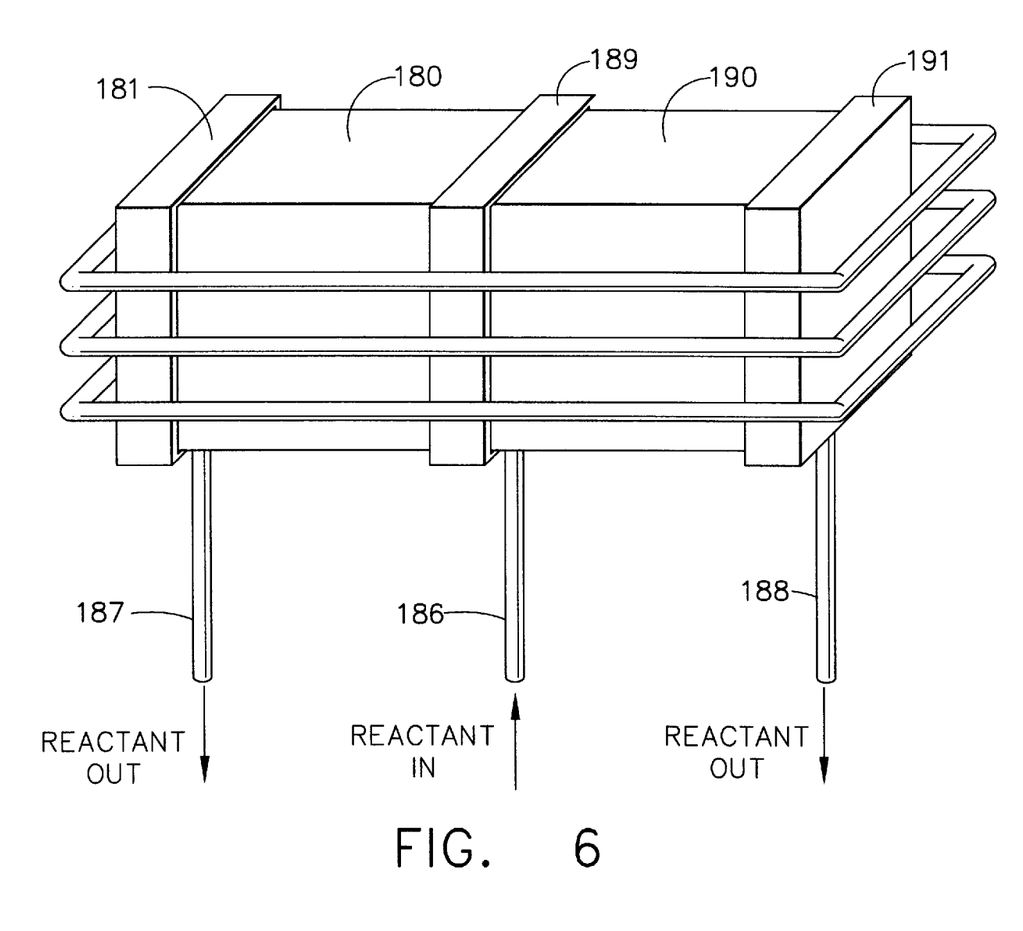
FIG. 6 is a diagram of an isometric view of two fuel cell stack connected together through external manifolds incorporating a recuperator loop with the fuel cell reactant inlet and outlet ends shown according to an embodiment of the present invention.

U.S. Pat. No. 5,340,664 provides for reactant preheat by means of a thermally integrated heat exchange system. The patent claims the use of heat from multiple fuel cell stacks. The heat is exchanged in a double thermal enclosure with incoming air and optionally provides the heat for endothermic reformer which is also enclosed in the thermal enclosure. The heating loops are embedded in the enclosure walls, and heat transfer is mainly by radiation. The heating passages are embedded in the enclosure wall and located between two insulation layers. Similar to U.S. Pat. No. 5,462,817, previously described, the patent requires one hot and one cold flow passage to complete the heat exchange process. The patent further specifies the use of a screw culvert heat exchanger (FIGS. 2 and 3) and plate passages (FIGS. 6 and 7). The claimed system may be thermally efficient, however, the mechanical structures needed for implementation add complexity, cost and weight to the fuel cells.

Other patents simplify the structural requirements for efficient exhaust heat re-uses by mixing fuel cell air and fuel exhaust with fresh colder air and fuel respectively, then recycle back into the cell (U.S. Pat. No. 6,136,462). No heat exchanger is needed for the claimed process. The system mixes heat as well as flow from two separate sources making the flow management quite complex. In yet another simplification attempt, a heat-pipe concept is used for heat exchange where heat transfer takes place through evaporation of an enclosed liquid (U.S. Pat. No. 6,146,779). The presence of a liquid coolant that facilitates heat transfer, again, adds a different complexity to the mechanical structure of a fuel cell.

A different approach to recycle exhaust heat is disclosed in U.S. Pat. No. 6,194,092 by coupling a hydrogen storage tank and a heat exchanger which transfers heat from the stack by convection and radiation in an enclosure. The hot air in the enclosure is forced into the storage tank by the aid of fans. Storage tank, fan and hydrogen are required for the complete system.

A Japanese Patent (JP 60035469), again, uses a separate fluid medium to transfer heat. This medium is not a reactant, as many previously discussed patents. The coolant loop is between some of the cells in a fuel cell stack. Also, the coolant is manifolded to individual cells. The design of such a system is complex and costly.

From the preceding, it becomes apparent that there is a need for a cost effective solution to recuperate waste heat from fuel cell stacks to thermally enhance the performance of fuel cell stacks while improving reliability and maintenance of the fuel cell without the added cost, structure and design complexity. A simple method and apparatus that eliminates the use of separate fluid for heat transfer and employs different heat transfer mechanisms as appropriate is needed to broaden the use of fuel cell stacks in various applications. A method to recuperate the exhaust heat from fuel cell stack without the use of a heat exchanger system or additional fluid is needed. An apparatus, which is flexible to work with single or multiple fuel cell stacks using the same design principle for various fuel cell geometry or arrangement while adaptive to the different structural requirement, is also needed for a fuel cell application.

SUMMARY OF THE INVENTION

The present invention provides an apparatus and method to exchange heat from the hot exhaust of fuel cell stacks and use it to preheat the incoming cooler air. The apparatus and method disclosed in the present invention overcomes many of the problems discussed in the prior art.

In one aspect of the present invention, a very simple heat exchanger is used for heat transfer between incoming air, which may be used as a fuel cell reactant, and exhaust heat through a combination of radiation and convection. The apparatus operates in a single passage spiral loop. The heated gases are freely blown over the heating loop. The spiral loop operates outside the fuel cell stack to provide an effective means of heat transfer with structural and design simplicity. Fins and dimples can be further added to the spiral loop to enhance the heat exchange mechanism. The simple design allows the spiral loop to be used in conjunction with a single fuel cell stack or multiple fuel cell stacks.

In another aspect of the present invention, the hot gases may be manifolded and directed out of the fuel cell stack(s) without flowing over the spiral loop. In this case, the heat exchange is by radiation between the hot fuel cell stack(s) and the cold oxidant flowing in the spiral loop.

In another aspect of the present invention, a method of increasing fuel cell reliability and maintainability is disclosed by integrating the recuperating loop into the fuel cell stack(s), simplifying heat exchange by reducing or eliminating the need for external recuperation, surrounding a stack or combination of stacks with a cylindrical spiral tube, directly flowing hot gas over the spiral tube, providing heating to the cathode flow in the tube, and feeding the pre-heated flow to the inlet of the fuel cell stack as a reactant of the fuel cell assembly. In this embodiment, the design complexity associated with a recuperator or heat exchanger at the outlet from the stack is avoided. The requirement for an external cooling medium, which is often a non-reactant fluid, pump, and re-circulation loop for heat exchange, and the maintenance and reliability associated with these components, have been eliminated. Thus, the reliability of the fuel cell assembly may be increased due to the structural and design simplicity.

In another aspect of the present invention, a spiral loop apparatus for the heat exchange at fuel cell stacks is comprised of a tube in rectangular or circular shape, a tube support such as an anchored or creep structure or simple tube supports at the inlet and/or outlet of fuel cell stack(s), and surface augmentation such as dimpling and/or fins if necessary. For high-temperature fuel cells, the tube may be made of any high temperature metal or thermally conductive composites being placed at an appropriate distance from the fuel cell stacks to best facilitate the heat transfer through radiation and convection. The loop structure is an integrated part of the fuel cell structure and the fluid flow in the tube is one of the reactants of the fuel cell electrochemical combustion ingredients.

In yet another aspect of the present invention, a single heat exchange loop is provided as an integral component of the fuel cell stacks. The loop is integrated with the structure of the fuel cell. The spiral loop is used to carry away the fuel cell waste heat which flows in the form of hot gases, with the coolant being a reactant of the fuel cell flowing directly to the inlet of the fuel cell. The loop is designed so that it can work with a fuel stack, either with or without manifolds. In the case of having the loop wrapping around a manifold, the loop is designed to be around the fuel cell stacks, not penetrating or embedded in the fuel cell stacks. The waste heat directly heats the tube wall which, in turn, heats the cooling fluid inside the tube. The heated fluid in the tube feeds into the fuel cell inlet as the preheated oxidant of the fuel cell stacks, eliminating the need of a separate heater structure to preheat the fuel cell reactants and the reliability thereof. Since the tube goes around the stack, not penetrating or embedding in the fuel cell, there is no sealing requirement or structural integration issues in the design aspect of the fuel cell.

These and other features, aspects and advantages of the present invention will become better understood with reference to the following drawings, description, and claims.

BRIEF DESCRIPTION OF THE DRAWINGS

FIG. 1b is a diagrammatic perspective view of a fuel cell stack that may be employed in the system of FIG. 1a;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
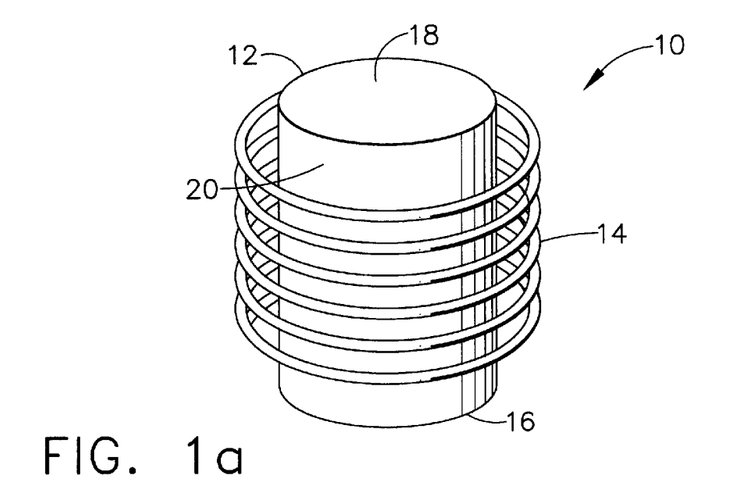
FIG. 1a is a diagrammatic perspective view of a fuel cell stack system incorporating a heating loop according to an embodiment of the present invention.

Referring to FIG. 1a, an internally manifolded fuel cell system 10 is shown in an embodiment including a ceramic/metal solid oxide fuel cell stack 12 and a fully integrated heating loop 14. Although a circular configuration is depicted, other configurations are within the scope of the present invention. The present invention contemplates that the fuel cell stack 12 can be used in the context of at least solid oxide fuel cells and molten carbonate fuel cells well known in the art. The fuel cell stack 12 may comprise an electrolyte/electrode sandwich and an interconnect plate as known in the art. Fuel and oxidant can be fed through either a bottom end 16 or a top end 18 of the fuel cell stack 12. An electrochemical reaction produces thermal energy in the form of exhaust heat and spent gases, releasing the heat and spent gases radially out at an outer surface 20. The fuel cell system 10 is thermally integrated by including a heating loop 14 that conforms to or matches the configuration of the outer surface 20 of the fuel cell stack 12. The heating loop 14 is designed as to be close enough to the outer surface 20 of the fuel cell stack 12 to effectively transfer the heat produced in the electrochemical processes within the fuel cell stack 12.

In the process of releasing the heat within the fuel cell system 10, the temperature of the fuel cell stack 12 may increase. The increased temperature can adversely affect the efficiency of a fuel cell operation. Thus, it is commonly known to those skilled in the arts to design a mechanism for heat removal that keeps the fuel cell within a desirable temperature range during operation. To facilitate the heat removal process according to one of the embodiments of the present invention, a heating loop 14 may be provided to absorb the heat released from the fuel cell stack 12. Heating loop 14 provides a flow channel for cooling fluid that travels from a first end of the channel to a second end. In one of the embodiments of the present invention, the cooling fluid may be one of the reactants necessary for the fuel cell stack 12 to initiate the electrochemical reaction, i.e., the fuel or oxidant. The oxidant may be any medium that is oxygen rich to provide the burning or combustion. The choice of oxidants normally includes air. For illustration purposes, air is used in the following discussion as the cooling fluid or agent that flows through the heating loop 14. But, it should be obvious to those skilled in the art that the oxidant and the coolant can include other choices normally used in a typical fuel cell system 10. It should also be obvious that the coolant agent and the oxidant may be different even though the present invention describes the cooling agent and oxidant to be the same for thermal integration.

Figure 1B:
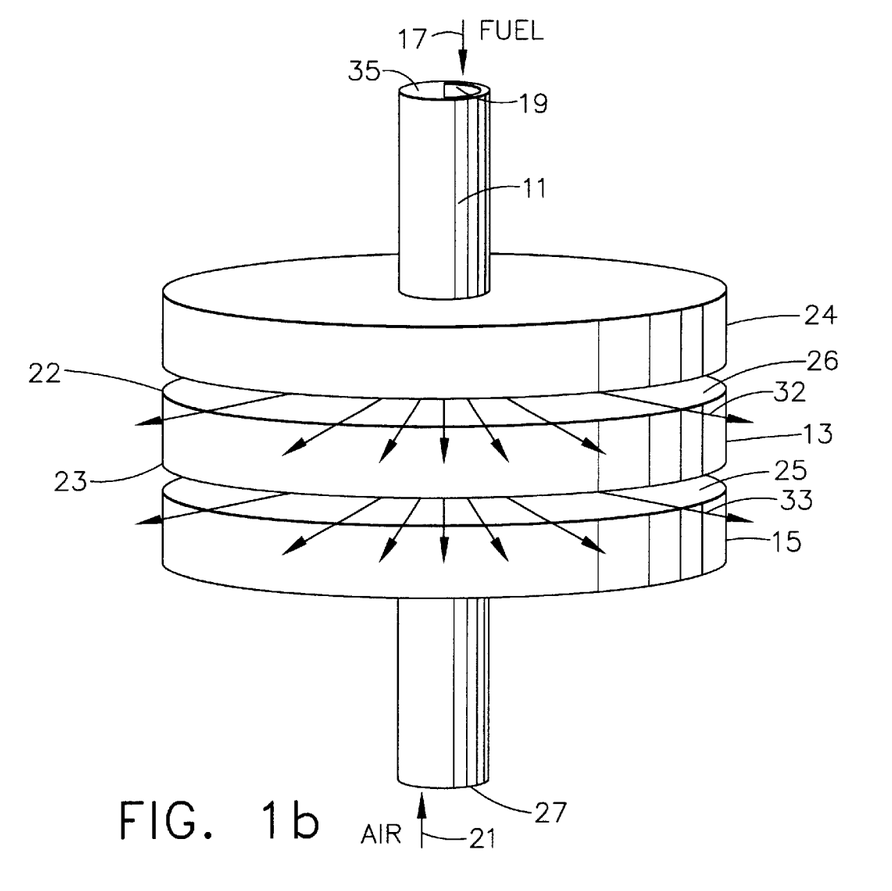
Figure 1C:
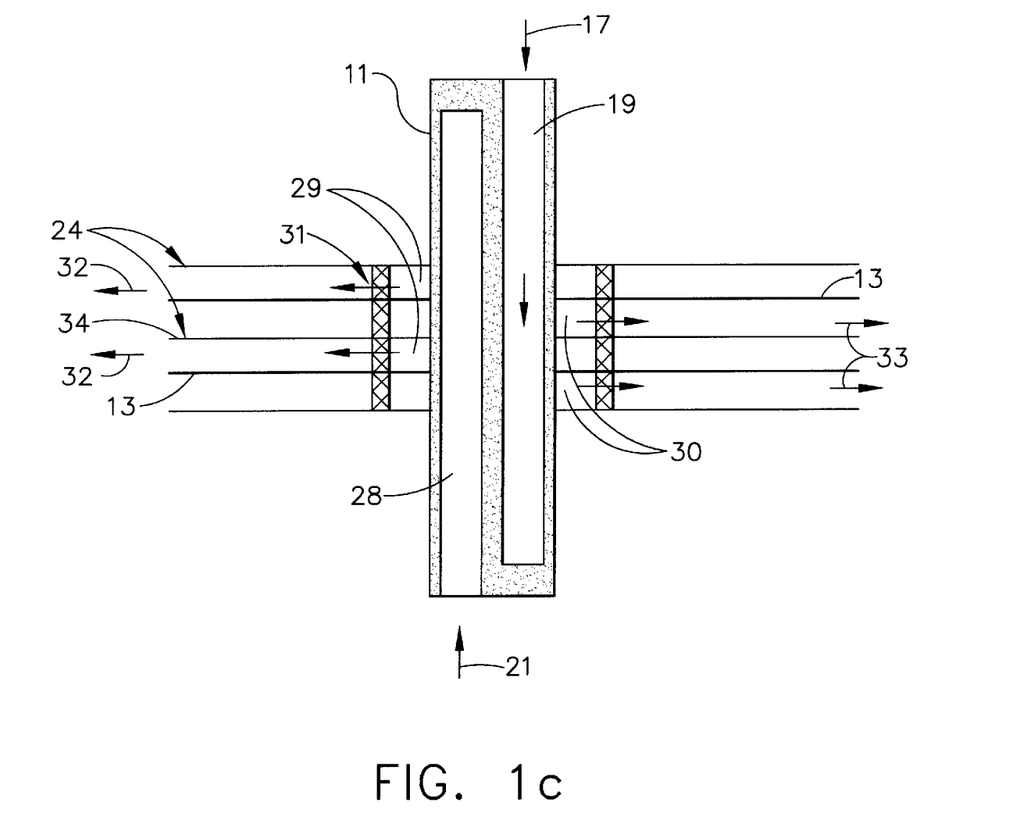
FIG. 1c is a cross sectional view of FIG. 1b showing the flow of reactants in a fuel cell stack according to an embodiment of the present invention.

Referring to FIGS. 1b and 1c, a fuel cell stack 12 that may incorporate the present invention includes a plurality of fuel cells 13 and interconnects 15, 24 well known in the art. Accordingly, the fuel cell 13 and interconnects 15, 24 may be in the shapes of thin disks stacked in an axial direction of an embedded manifold 11. The axial direction of the fuel cell stack 12 refers to the direction of reactant flow. The fuel cell 13 may be sandwiched between a first interconnect 15 and a second interconnect 24 in the axial direction of the fuel cell stack 10. The embedded manifold 11 within the fuel cell stack 12 can be located close to the center of the stack 12, connecting a plurality of alternating fuel cells and interconnects. In this embodiment of the present invention, the embedded manifold 11 may provide the mechanical support to balance the fuel cell 13 and the interconnects 15, 24 along the centers. In addition, the embedded manifold 11 may provide flow communication to the fuel cell 13 and interconnects 15, 24. The fuel cell 13 may have two surfaces—an anode surface 22 and a cathode surface 23. The two surfaces may be separated by the thickness of the cell, one surface on the opposite side of the other.

Still referring to FIGS. 1b and 1c, two flow channels may be formed inside the embedded manifold 11. A first flow channel 19 may provide the passage for the first reactant flow 17 necessary for the electrochemical reaction to occur in the fuel cells. The first reactant flow in the present embodiment is the fuel flow 17 for the purposes of the following discussion. The fuel flow 17 can enter the fuel cell stack 12 from the top surface 18 through a first end 35 of the embedded manifold 11 (FIG. 1b). The fuel flow 17 travels along the axial direction of fuel cell stack 12 inside the first flow channel 19 and towards the anode surface 22 of the fuel cell 13. A second reactant, air, can enter the fuel cell stack 12 from the bottom surface 16 through a second end 27 of the embedded manifold 11. The airflow 21 travels in a second flow channel 28 inside the embedded manifold 11 along the axial direction of fuel cell stack 12 but in the opposite direction to the fuel flow 17 and towards the cathode surface 23 of fuel cell 13.

The airflow 21 communicates with the fuel cell 13 through a first set of orifices 29 and allows the air to flow over the cathode surface 23 of fuel cell 13. The air 21 that exits the orifices 29 flows through a set of annular flow distributors 31. The fuel flow 17 similarly flows through a second set of orifices 30 and the annular flow distributor 31 and then over the anode surface 22. An electrochemical reaction occurs at the fuel cell 13 when the air, acting as an oxidant, is present on the cathode surface 23 and the fuel is present on the anode surface 22. A practical limit of 90% fuel utilization may be possible according to one of the embodiments. It is not desirable to attempt to react all of the fuel in the fuel cell stack 12. Thus, the un-reacted fuel may be combusted in a post-stack combustion chamber (not shown).

The end products of the electrochemical reaction at the fuel cell 13 are depleted air 32, depleted fuel 33, and waste heat (FIGS. 1b and 1c). The waste heat causes the depleted fuel 33 and depleted air 32 to be hotter than the air flow 21 and fuel flow 17 entering through the orifices 29, 30. The hotter depleted fuel 33 travels radially outward along a first set of annular gaps or channels 26 formed by the first interconnect 24. Likewise, the hotter depleted air 32 travels radially outward along a second set of gaps or channels 25 formed by the second interconnect 15. When the exhaust is not manifolded as shown in FIGS. 1b and 1c, the depleted gases combust at the exterior edges of the fuel cells, a process that produces more waste heat.

In one embodiment for an integrated configuration of the heating loop 14 and fuel cell stack 12 (FIG. 1a), the fuel cell stack 12 essentially operates adiabatically. The temperatures of hotter depleted air and fuel 32, 33 continue to rise as the combustion at the fuel cell 13 continues. The hotter depleted air and fuel 32, 33 exit the fuel cell stack 12 radially flowing through the channels formed by the interconnects. Depleted hot gases flow over the heating loop 14. Convection and radiation processes occur between the hot exhaust gases and the cooler surface of the heating loop 14. The temperature difference between the depleted hot gases and an exterior wall of the heating loop 14 effectuates a heat transfer mechanism to capture the heat of the depleted gases.

The flowing fluid in the heating loop 14 facilitates the heat recuperation process. Depending on the flow rate and volume of the fluid inside the heating loop 14, a steady state temperature distribution can be reached among the depleted gases 32 and 33, the exterior wall of the heating loop 14, and the fluid flowing inside the heating loop 14. More specifically, the air enters the heating loop 14 at a lower temperature, typically at room temperature. The hotter depleted air 32 and fuel 33 transfer heat to the heating loop 14 and then to the fluid (e.g., air), increasing the fluid temperature. The fluid then exits the heating loop 14 at a higher temperature. In one embodiment of the present invention, this hotter fluid can flow directly into the second flow channel 28 inside the embedded manifold 11 to be used as a pre-heated oxidant 21 (i.e., when the fluid is air) for the fuel cell stack 12 (FIG. 1a).

Thus, the heating loop 14 and fuel cell stack 12 may be fully integrated by sharing a continuous flow of oxidant. Furthermore, the radially projected heat may be recovered by the heating loop 14 for pre-heating the oxidant flow 21 into the fuel cell stack 12. This embodiment of the present invention effectively removes the need for a separate coolant fluid and an additional pre-heater for the oxidant flow 21. Therefore, the present design provides simplicity.

As mentioned above, the fluid flow rate in the heating loop 14 can regulate the removal of thermal energy in the fuel cell system 10. The heat transfer between the heating loop 14 and the fuel cell stack 12 may rely upon thermal radiation and convection. The radiation and convection through the gap is capable of high thermal flux when the temperature rise in the fuel cell stack 12 is optimized. Smaller temperature rises require greater airflow, increasing compressor parasitic power requirements. Greater temperature rises result in more severe thermal stresses and either higher stack operating temperatures (which may result in material property issues and increased exhaust gas heat losses) or lower stack operating temperatures (with more difficulty in maintaining fuel cell efficiency). For example, a fuel cell stack, which produces 31.5 watts from the electrochemical reaction, may produce 22.5 watts of power and 9 watts of heat. A post combustion chamber may further produce 3.5 watts of heat. The combined heat of 12.5 watts, which comprise 9 watts of heat plus 3.5 watts from post combustion heat, may suffer a 5.0 watt surface loss in the process. Assuming the air enters the heating loop 14 at 25° C. and a 200° C. temperature rise is required in the fuel cell stack 12, the air may exit the heating loop 14 at 600° C., enter the fuel cell stack 12 at the same temperature, and leave the fuel cell stack 12 at 800° C. if the airflow remains at 0.155 kilogram per hour. The heat pick up by the heating loop 14 is thus 9 watts. A steady state performance calculation, as accomplished for this example, may be performed to determine the desired flow rate for specific design cases.

Also, as indicated above, the heating loop 14 can be mechanically integrated into the fuel cell system 10 by connecting an exit end of heating loop 14 to an inlet end of the oxidant flow channel 28. Furthermore, portions of the interconnects 15, 24 and/or a separator plate 34 can be extended structurally beyond the outer surface 20 of the fuel cell stack 12 to provide mechanical support to the heating loop 14. Care must be taken to electrically isolate the loop from the cells and interconnects by using an insulator to provide mechanical structure. Accordingly, the heating loop 14 of the present invention can be completely integrated into the fuel cell system 10 in reactant flow communication, as opposed to being a decoupled element of the system.

The material selection of the heating loop 14 is based on stack operating temperature and heat removal from the fuel cell system 10. Thus, the optimal selection of the heating loop materials can be materials with good convective characteristics such as a high temperature metal like titanium and niobium or a thermally conductive metal like nickel based alloy and cobalt for solid oxide fuel cell applications.

In yet another embodiment of the heating loop 14, surface augmentation can be provided, such as fins, to enhance heat transfer by increasing the contact surfaces in thermal convection. Dimpling, typically in the form of dents to increase exposure surfaces, can be added to the heating loop 14 surfaces to further enhance the heat transfer process. Surface augmentation of heating loop 14 may also be provided for reactant fluid in the heating loop 14.

The geometrical aspect of the heating loop 14 can affect the heat transfer effectiveness in the fuel cell system 10. The heating loop 14 in FIG. 1a is a cylindrical spiral type with a circular cross section around the fuel cell stack 12. It should be obvious to those skilled in the art, however, that the cross section of the heating loop passage can be triangular, rectangular, or any shape that can effectively remove waste heat from the fuel cell stack 12. The cylindrical spiral shape loop 14 around the fuel cell stack 12 can also be wrapped more densely with a space between two consecutive loops approximately 2 mm in the axial direction when the amount of heat generated is greater.

Figure 2:
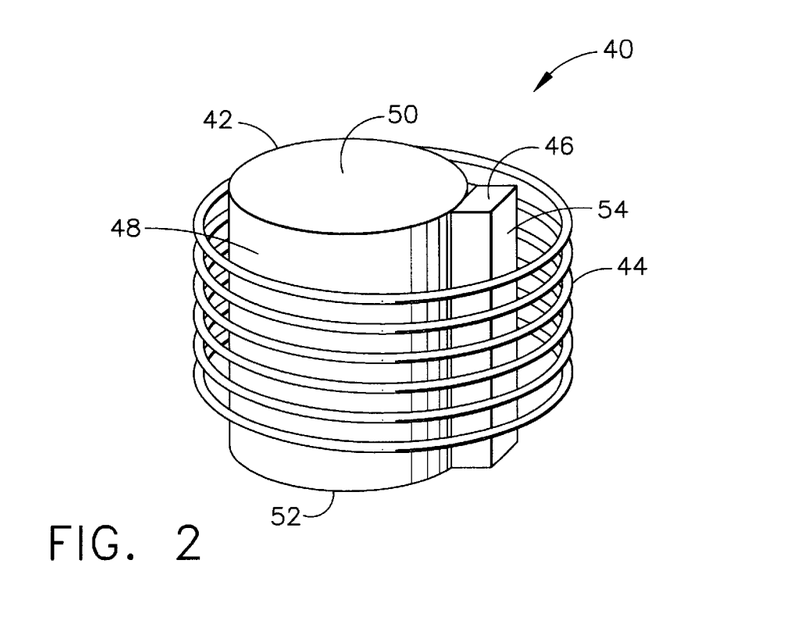
FIG. 2 is a diagram of an isometric view of a fuel cell stack with an external manifold and a heating loop according to an embodiment of the present invention.

FIG. 2 is an embodiment of an externally manifolded fuel cell stack system 40 that can comprise a circular fuel cell stack 42, a heating loop 44, and an external manifold 46. In a manner well known in the art, the external manifold 46 can flow gases into fuel cell stack 42 similar to that described in FIGS. 1a–c. Although various materials can be used to construct the manifold 46, preferred materials include ceramics, glass ceramics, metallic alloys, oxidation resistant metallic alloys, metal-ceramic composites and intermetallics. One geometrical shape of the external manifold 46 can be a rectangular but other shapes could be used. The outer peripheries of the external manifold 46 may extend substantially to the outer peripheries or outer surface 48 of the fuel cell stack 42. The external manifold 46 is preferably positioned in a tangential location where the external manifold 46 and the fuel cell stack 42 are structurally connected adjacent to each other. As shown in FIG. 2, the external manifold 46 can extend axially from a first or top side 50 of stack 42 and to a second or bottom side 52 of the fuel cell stack 42. Formed within the external manifold 46 are two interior cavities (not shown) for reactant flows into fuel cell stack 42 that extend along the axial length of the manifold 46 similar to those described in FIGS. 1a–c.

As in the embodiment shown in FIGS. 1a–c, an electrochemical reaction produces heat in the form of exhaust heat and spent gases are released radially toward the outer surface 48 of the fuel cell stack 42. During this process, the temperature of the fuel cell stack 42 rises. Hotter depleted fuel and air causes the temperature of the external manifold 46 to rise as well. The temperature difference between the hotter depleted air/fuel flow and the wall of heating loop 44 creates a temperature gradient across the gap between the fuel cell stack 42 and the heating loop 44. Similarly, the temperature difference between an outer surface 54 of the manifold 46 and the wall of heating loop 44 can create a temperature gradient across the gap between the manifold 46 and the heating loop 44. Like in the above embodiment, the temperature gradient can effectuate a heat transfer mechanism to remove the heat, primarily through radiation and convection, from the fuel cell stack 42 and manifold 46.

As in the above embodiment, the heating loop 44 can be mechanically integrated into the fuel cell system as described in the above embodiment. Alternatively, it can be secured by mechanical fasteners or bonded onto the external manifold 46 thus reducing the cost, size and design complexity. The material selection and configuration of the heating loop 44 can also be as in the above embodiment. Consequently, a reactant fluid can also flow through the heating loop 44, as in the above embodiment. Further, the heating loop 44 may have surface augmentation as above.

Figure 3:
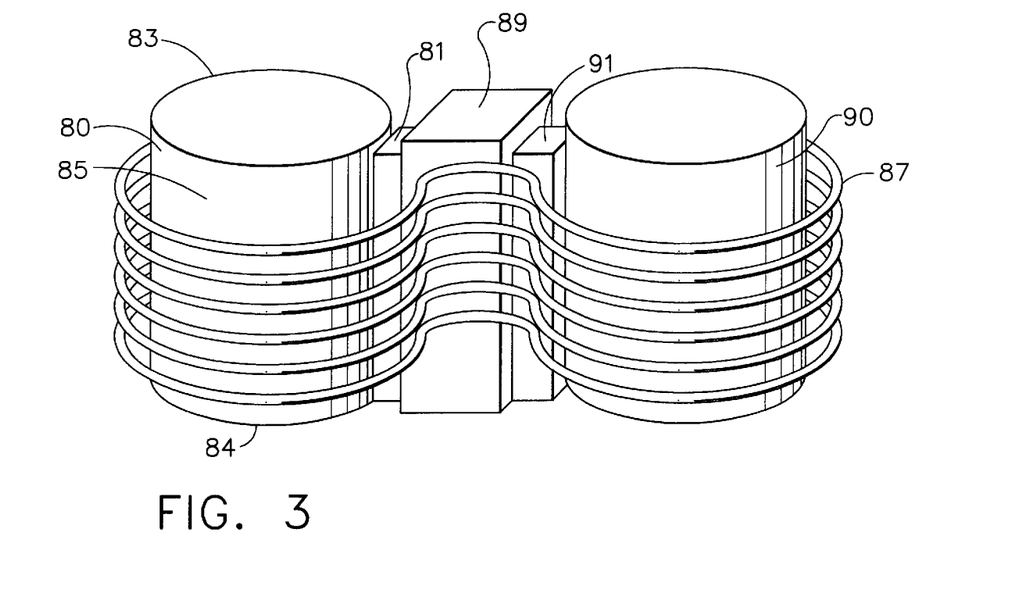
FIG. 3 is a diagram of a side view of two radial flow fuel cell stacks connected together showing an internal manifold feeding two stacks and a heating loop according to an embodiment of the present invention.

FIG. 3 shows a parallel connection of externally manifolded stacks. In general, the embodiment of FIG. 3 is the same as that in FIG. 2, except that there is a plurality of stacks in the former. A first fuel cell stack 80 and a second fuel cell stack 90 are connected in parallel according to the embodiment of FIG. 3. For purposes of illustration, the first and second fuel cell stacks 80, 90 are depicted as radial fuel cell stacks. For simplicity, only two stacks are shown in FIG. 3. In general, any number of fuel cell stacks can be fit inside the heating loop 87.

As in the embodiment of FIG. 2, the first radial fuel cell stack 80 can include a first external manifold 81 that flows gases into the stack 80. The outer peripheries or surface of the first external manifold 81 may extend substantially to the outer surface 85 of the fuel cell stack 80. The first external manifold 81 is preferably positioned in a tangential location or at the outer edge of the fuel cell stack 80 where the external manifold 81 and the fuel cell stack 80 may be structurally connected adjacent to each other similar to that described in the embodiment of FIG. 2. In FIG. 3, the first external manifold 81 may extend from a first or top side 83 of fuel cell stack 80 and to a second or bottom side 84 of the fuel cell stack 80. Formed within the first external manifold 81 can be two interior cavities (not shown) that extend along the axial length of the first manifold 81. Both cavities flow reactant gases into the manifold 81.

The second radial fuel cell stack 90 may be constructed and operate in a fashion similar to the first radial fuel cell stack 80. However, different constructions can be used. Having a construction and function similar to the first radial stack 80, the second radial stack 90 can include a second external manifold 91 similar to the first manifold 81. Therefore, formed within the second external manifold 91 can be two interior cavities that extend along the longitudinal length of the second manifold 91 to flow the gases into the manifold 91.

For the purposes of illustration, the second fuel cell stack 90 and its second external manifold 91, as shown in FIG. 3, are mirror images of the first fuel cell stack 80 and its manifold 81. The outward faces of the first manifold 81 and the second manifold 91 are positioned to oppose each other. A connection element 89 is disposed between first and second manifolds 81 and 91. The connection element 89, as shown in FIG. 3, can be a rectangular shaped element extending from the first manifold 81 radially outward towards the second manifold 91, forming a combined/integral external manifold feeding both fuel cell stacks. The connection element 89 may cover the entire lengths of the first and second manifolds. The connection element 89 can be in other forms or shapes. The first and second fuel cell stacks 80, 90 can be positioned at any relative angle to each other while the connection element 89 is shaped to provide the required linkage, forming a multi-stack fuel cell assembly.

Formed within the connection element 89 can be two interior cavities that extend along the axial length of the element 89 (not shown). Both cavities flow gases into the element 89. The cavities therein can be connected internally to the cavities inside the first and second manifolds 81, 91 to provide flow communication for the multi-stack fuel cell assembly. The gases are then distributed to the first and second fuel cell stacks 80, 90 through the flow communication within the first and the second manifolds 81, 91.

As with the above embodiments, electrochemical reactions produce thermal energy in the form of exhaust heat and spent gases are released radially outward from the fuel cell stacks 80, 90. In the process of releasing the heat radially, the temperatures of the fuel cell stacks 80, 90 rise. Similarly the temperatures at the external manifolds 81, 91 and the connection element 89 rise. The temperature difference between the fuel cell stacks 80, 90 and the wall of heating loop 87 creates temperature gradients across the gaps between the fuel cell stacks 80, 90 and the heating loop 87. Similarly, the temperature differences between the outer surfaces of the manifolds 81 and 91, together with the connection 89, and the wall of heating loop 87 create temperature gradients across the gap (not shown) between the manifolds 81, 91, as well as the interconnect 89, and the heating loop 87. The temperature difference between the depleted hot gases and the wall of heating loop 87 creates a temperature gradient across the gap between the fuel cell stacks 80 and 90, and the heating loop 87. The temperature gradients effectuate a heat transfer mechanism to remove the heat by convection and radiation from the fuel cell stacks, manifolds, and interconnect.

Similar to the above embodiments, thermal radiation and convection through the gaps is capable of high thermal flux depending on the flow rate and volume of the coolant through the heating loop 87. A steady state performance calculation can be performed in the fuel cell system design phase to choose the proper temperature rises in the fuel cell stacks 80 and 90, the manifolds 81 and 91, the connection element 89, and the optimal fluid flow rate in the heating loop 87. The gap distances can vary at different external locations, but generally in the same ranges, as in the above embodiments. Likewise, the heating loop 87 is configured to follow the exterior contours of the stacks, manifolds, and interconnect element, and it may be constructed and operated as in the above embodiments.

Figure 4:
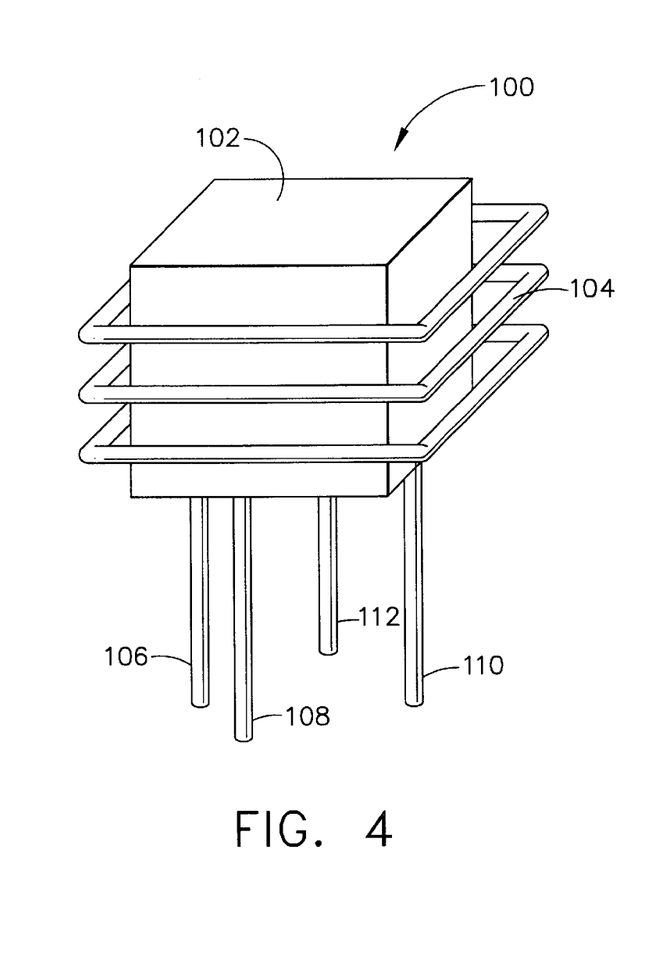
FIG. 4 is a diagram of an isometric view of a fuel cell stack incorporating a recuperator loop with the fuel cell reactant inlet and outlet ends shown according to an embodiment of the present invention.

In FIG. 4, an embodiment of an internally manifolded, thermally integrated rectangular fuel cell system 100 for a ceramic/metal solid oxide fuel cell stack 102 including a fully integrated recuperator loop 104 is shown. Fuel cell stack 102 can have internal flow cavities/channels (not shown) that are similar in construction and operation to the embodiment shown in FIGS. 1a–c. However, in contrast to the embodiment of FIGS. 1a–c, this embodiment has an overall rectangular configuration. Accordingly, from a top cross sectional view (not shown), the various components of the fuel cell stack 102 have a rectangular cross section. Furthermore, flow channels 106, 108, 110 and 112 are outside the fuel cell stack 102. The channels 106, 108 can allow external connections between different fuel cell stacks and with the fuel and oxidant flows from the recuperator loop 104 (not shown). The flow channels 110 and 112 can allow the exhaust gases exit the stack 102 (not shown). In such configuration, the exhaust hot gases do not flow over the heating loop 104, but they are manifolded (not shown) and exit the stack through flow channels 110 and 112.

The internal manifold (not shown) can extend from a first or topside of the stack 102, through the stack 102, and out of a second or bottom side of the stack 102. A reactant gas may flow into one of the open flow channels 106 and 108 while the other reactant flows through another of the channels. As with the above embodiments, and in the process of releasing heat, the temperature of the fuel cell stack 102 rises. The temperature difference between the fuel cell stack 102 and the wall of recuperator loop 104 creates a temperature gradient across the gap between the two structures. The temperature gradient effectuates a heat transfer mechanism to remove the heat, primarily through radiation, from the fuel cell stack 102. The design, construction, and operation can be the same as in the above heating loops.

FIG. 5 is an externally manifolded, thermally integrated fuel cell system 140 including a ceramic/metal solid oxide fuel cell stack 122 and a fully integrated recuperator loop 124. Thus, this embodiment is similar to that shown in FIG. 4, except that the latter is internally manifolded. Thus, the fuel cell stack 122 includes a pair of external manifolds 132 that flow gases into fuel cell stack 122. One external manifold can each be positioned at opposite ends of the fuel cell stack 122. In this embodiment, a reactant gas may flow into one of the externally exposed channels 126, 128 while the exhaust gas flows through another of the channels 126, 128. While the channels and manifolds for a second reactant and exhaust are not shown, they can be attached to the two exposed sides of the stack. The recuperator loop 124 is designed, constructed, and operated in a fashion similar to the above embodiments of recuperator loops.

Referring to FIG. 6, two serially connected fuel cell stacks with external manifolds are depicted. This embodiment is similar to that shown in FIG. 5, except that multiple stacks 180 and 190 are provided among multiple manifolds 181, 189, and 191. As in the above embodiments with multiple stacks, the stacks 180 and 190 may have the same or a different design and shape. In either event, an external manifold 181 can be positioned at one end of the fuel cell stack 180. A second external manifold 191 can be positioned at an end of the second fuel cell stack 190. The open ends of the stacks 180 and 190 are so positioned that they face each other with a third manifold 189 therebetween. The third manifold 189 can extend from the first stack 180 towards the second stack 190 forming an integral manifold that feeds both fuel cell stacks and provides the necessary flow and electric connections. The first and second fuel cell stacks 180, 190 can be positioned at any relative location to each other while the manifold 189 provides the required mechanical and gas communication linkage. Thus, one reactant can enter the manifold 189 via an inlet 186 and flow through the fuel cells to exhaust manifolds 181 and 191. The depleted first reactant is exhausted through channels 187 and 188. The other reactant can be supplied to each stack by attaching separate manifolds (not shown) to the two exposed sides of each stack. As shown in FIG. 6, a recuperator loop 184 can be designed, constructed, and operated like the above recuperator loops.

Although the present invention has been described in considerable detail with reference to certain versions thereof, other versions are possible. Therefore, the spirit and scope of the appended claims should not be limited to the description of the versions contained

We claim:

1. An apparatus for removing waste heat from a fuel cell, comprising:
   a heating loop;
   said loop being configured to extend about an exterior contour of said fuel cell;
   said loop being positioned adjacent said fuel cell such that a gap exists between said loop and fuel cell; and
   whereby a temperature gradient exists across said gap such that said loop absorbs said waste heat.

2. The apparatus of claim 1, wherein said loop is positioned adjacent an external manifold in communication with said fuel cell.

3. The apparatus of claim 2, wherein said loop is configured to extend about an exterior contour of said external manifold.

4. The apparatus of claim 2, wherein a gap exists between said loop and external manifold.

5. The apparatus of claim 1, wherein said heating loop is in coolant communication with a manifold connected to said fuel cell.

6. The apparatus of claim 1, further comprising a coolant that flows through said heating loop.

7. The apparatus of claim 1, wherein said heating loop further comprises a wall having surface augmentation to increase an adsorption of said waste heat.

8. The apparatus of claim 1, wherein said fuel cell is part of a fuel cell stack.

9. The apparatus of claim 1, wherein said fuel cell is part of a plurality of fuel cell stacks.

10. An apparatus for removing waste heat from a first and a second fuel cell stack, comprising:
    a heating loop configured to extend about an exterior contour of said first and second fuel cell stacks;
    said first and second fuel cell stacks being one of internally and externally manifolded by at least one manifold;
    said loop being positioned adjacent said first and second fuel cell stacks such that a gap exists between said loop and first and second fuel cell stacks; and
    whereby a temperature gradient exists across said gap such that said loop absorbs said waste heat.

11. The apparatus of claim 10, further comprising a coolant that flows through said heating loop.

12. The apparatus of claim 11, wherein said coolant comprises a reactant gas that is combusted in at least one of said first and second fuel cell stacks.

13. The apparatus of claim 12, wherein said coolant comprises air or an oxygen rich gas.

14. The apparatus of claim 10, wherein said at least one manifold is externally manifolded and said heating loop extends about an exterior contour of said at least one manifold.

15. The apparatus of claim 14, wherein said heating loop is positioned adjacent said at least one manifold such that a gap exists between said heating loop and said at least one manifold.

16. The apparatus of claim 10, wherein at least one of said first and second fuel cell stacks produce spent gases that flow across said heating loop.

17. An apparatus for removing waste heat from a first and a second fuel cell stack, comprising:
    a heating loop configured to match an exterior contour of at least one of said first and second fuel cell stacks;
    said loop being positioned adjacent at least one of said first and second fuel cell stacks such that a gap exists between said loop and at least one of said first and second fuel cell stacks;
    at least one of said first and second fuel cell stacks producing spent gases that flow across said heating loop; and
    whereby a temperature gradient exists across said gap such that said loop absorbs said waste heat.

18. The apparatus of claim 17, wherein said heating loop is configured to match an exterior contour of both of said first and second fuel cell stacks.

19. The apparatus of claim 17, wherein said heating loop is positioned adjacent both of said first and second fuel cell stacks.

20. The apparatus of claim 17, wherein both of said first and second fuel cell stacks produce spent gases that flow across said heating loop.

21. The apparatus of claim 17, wherein said first and second fuel cell stacks are internally manifolded.

22. The apparatus of claim 17, wherein said first and second fuel cell stacks are externally manifolded.

23. A method of removing waste heat from a fuel cell stack, comprising:
    positioning a heating loop about said fuel cell stack;
    producing a temperature gradient between said heating loop and said fuel cell stack; and
    flowing spent gases from said fuel cell stack across said heating loop.

24. The method of claim 23, further comprising creating a gap between said heating loop and said fuel cell stack.

25. The method of claim 23, further comprising matching a configuration of said heating loop with an outer surface of said fuel cell stack.

26. The method of claim 23, further comprising flowing a coolant through said heating loop.

27. The method of claim 26, further comprising flowing said coolant from said heating loop and to said fuel cell stack.

28. An apparatus for removing waste heat from a fuel cell system, comprising:
    a fuel cell for combining a fuel and an oxidant to produce electricity and the waste heat;
    said fuel cell comprising a first exterior shape; and
    a recuperation path with a fluid flowing therein positioned about the fuel cell;
    said recuperation path comprising a second exterior shape such that said second exterior shape conforms to said first exterior shape;
    said fluid comprising said fuel or said oxidant such that said fluid passes through said recuperation path and then enters said fuel cell after absorbing the waste heat.

29. The apparatus of claim 28, wherein said first exterior shape and said second exterior shape comprise a substantially circular shape.

30. The apparatus of claim 28, wherein said first exterior shape and said second exterior shape comprise a substantially rectangular shape.

* * * * *